United States Patent
Nishikura et al.

[11] Patent Number: 5,854,528
[45] Date of Patent: Dec. 29, 1998

[54] ULTRASONIC MOTOR

[75] Inventors: Takahiro Nishikura, Nara; Masanori Sumihara; Takashi Nojima, both of Osaka; Osamu Kawasaki, Kyoto, all of Japan

[73] Assignee: Matsushita Electric Industrial Co., Ltd., Osaka, Japan

[21] Appl. No.: 647,724

[22] Filed: May 15, 1996

[30] Foreign Application Priority Data

May 15, 1995 [JP] Japan .................................. 7-116167

[51] Int. Cl.⁶ .................................................. H01L 41/08
[52] U.S. Cl. ............................................... 310/323; 310/82
[58] Field of Search ................................ 310/323, 328, 310/82, 366

[56] References Cited

U.S. PATENT DOCUMENTS

| | | | |
|---|---|---|---|
| 4,959,579 | 9/1990 | Kuwabara et al. | 310/323 |
| 5,448,127 | 9/1995 | Kanazawa | 310/323 |
| 5,451,827 | 9/1995 | Takagi | 310/323 |
| 5,471,108 | 11/1995 | Guyomar et al. | 310/323 |
| 5,521,455 | 5/1996 | Miyazawa et al. | 310/323 |

FOREIGN PATENT DOCUMENTS

| | | |
|---|---|---|
| 0 627 774 | 12/1994 | European Pat. Off. . |
| 62-201072 | 9/1987 | Japan . |
| 63-64581 | 3/1988 | Japan . |
| 3-261384 | 11/1991 | Japan . |

Primary Examiner—Mark O. Budd
Attorney, Agent, or Firm—Wenderoth, Lind & Ponack

[57] ABSTRACT

An ultrasonic motor has a vibrating body 3 and a moving body 11 supported by a supporting component 7. A rounded lower end of the supporting component is supported in a tapered dent of a supporting base 10, and therefore when a side pressure is applied, it inclines to the supporting base so as to keep the contact between the vibrating body and moving body stable. As a result, a stable motor rotation is always obtained regardless of side pressure. A lead wire 8 is held between a metal elastic element 1 and supporting component, and is pressed against the elastic element. Hence, the lead wire, through contact with the elastic element, is electrically coupled to the common electrode on the upper surface of a piezoelectric element without soldering and without use of conductive resin.

14 Claims, 18 Drawing Sheets

ULTRASONIC MOTOR

FIELD OF THE INVENTION

The present invention relates to a structure of an ultrasonic motor driven by vibrations due to an inverse piezoelectric effect of a piezoelectric element such as a piezoelectric ceramic.

CONVENTIONAL ART

FIG. 22 shows a structure of a conventional ultrasonic motor. A vibrating body 28 is composed of a metal elastic element 26 and a flat ring-shaped piezoelectric element 27 adhered to the elastic element 26. A moving body 31 contacting with the vibrating body 28 is rotatably supported on a supporting base 35 through a bearing 34. A spring 30 containing a vibration absorbing material 29 fixes the vibrating body 28 in the rotating direction, and presses the vibrating body against the moving body 31. A lead wire 36 supplies a voltage to the piezoelectric element 27. FIG. 23 shows a side of the piezoelectric element 27. Poles a1 to a5, b1 to b5 for generating elastic vibrations of six waves in the circumferential direction are formed in the ring thickness direction. The signs + and − denote polarity of the poles. The poles a1 to a5 and b1 to b5 are positioned at a phase difference of 90 degrees and are separated by a space of $\lambda/4$. Five individual electrodes A, B, C1, C2, and D cover the surface of the piezoelectric element 27. The hatched individual electrode A covers the poles a1 to a5, and the hatched individual electrode B covers the poles b1 to b5. The opposite side of the piezoelectric element 27 adhered to the elastic element 26 is entirely covered with a common electrode, and the electrode C2 is coupled with this common electrode through a conductive resin (not shown). The poles a1 to a5 are excited by a voltage $V1=V0 \sin(\omega t)$ applied between the individual electrode A and common electrode C2. The poles b1 to b5 are excited by a voltage $V2=V0 \cos(\omega t)$, which is a 90-degree time phase difference from V1, applied between the individual electrode B and common electrode C2. The individual electrodes C1 and D are used for a purpose not described herein. FIG. 6 illustrates a motor drive. The piezoelectric element 27 (2 in FIG. 6) is vibrated by the inverse piezoelectric effect caused by these voltages V1, V2, and thereby elastic vibrations occur in the elastic element 26 (1 in FIG. 6). In this case, the traveling direction of the elastic vibration waves is rightward as indicated by arrow 43. Surface points of the elastic element 26 move along an ellipse as shown in the diagram. The moving body 31 (11 in FIG. 6), pressed to the elastic element 26, is frictionally driven by this elliptical move, and moves in the direction of arrow 44 opposite to the arrow 43. FIG. 24 shows a lead wire means 36 composed of a flexible printing pattern for feeding the output of a driving circuit (not shown) to the individual electrodes A, B, C1 and common electrode C2. The lead wire means 36 comprises a first lead wire 8 for coupling the common electrode and driving circuit, and plural second lead wires 6 for coupling the individual electrodes and driving circuit. The first lead wire 8 is soldered to the electrode C2. The plural second lead wires 6 are soldered to the individual electrodes A, B, C1, respectively. In this way, the common electrode of the opposite side is fed from the electrode C2 through a conductive resin (not shown). The conductive resin, however, has its own problem in reliability in severe environments. If the first lead wire 8 can be directly soldered to the common electrode of the opposite side, the conductive resin can be omitted. Heating for soldering, however, raises the entire temperature of the elastic element 26 very high due to the high thermal conductivity of the elastic element 26, and thereby the adhesion between the elastic element 26 and piezoelectric element 27 deteriorates. The invention presents coupling to the common electrode of the first lead wire 8 free from such problems. Moreover, since the vibrating body 28 is supported by the spring 30 containing the vibration absorbing material 29, a problem occurs in the concentricity of the vibrating body 28 and moving body 31. It is hence an object of the invention to present a way of supporting the vibrating body 28 which is free of such problems.

SUMMARY OF THE INVENTION

The ultrasonic motor of the invention comprises a moving body, and a vibrating body having a metal elastic element and a piezoelectric element. The piezoelectric element has its common electrode on its upper surface electrically coupled with the elastic element. The upper surface of the piezoelectric element is fixed to the lower surface of the elastic element.

A supporting component supports the motor. A rounded lower end of the supporting component is supported in a taper dent of a supporting base. When a side pressure is applied, the motor can be inclined to the supporting base so as to keep the contact between the vibrating body and moving body stable. As a result, regardless of the side pressure, a stable motor rotation may be always obtained.

In order that the lead wire may be electrically coupled with the common electrode on the upper surface of the piezoelectric element through contact with the elastic element, it is placed between the metal elastic element and the supporting component and is pressed against the elastic element. As a result, the lead wire is electrically coupled with the common electrode of the piezoelectric element without soldering and without using conductive resin, thereby preventing damage due to the high temperature of soldering or the instability of conductive resin.

EXEMPLARY EMBODIMENTS

(1ST EMBODIMENT)

Figure 1:
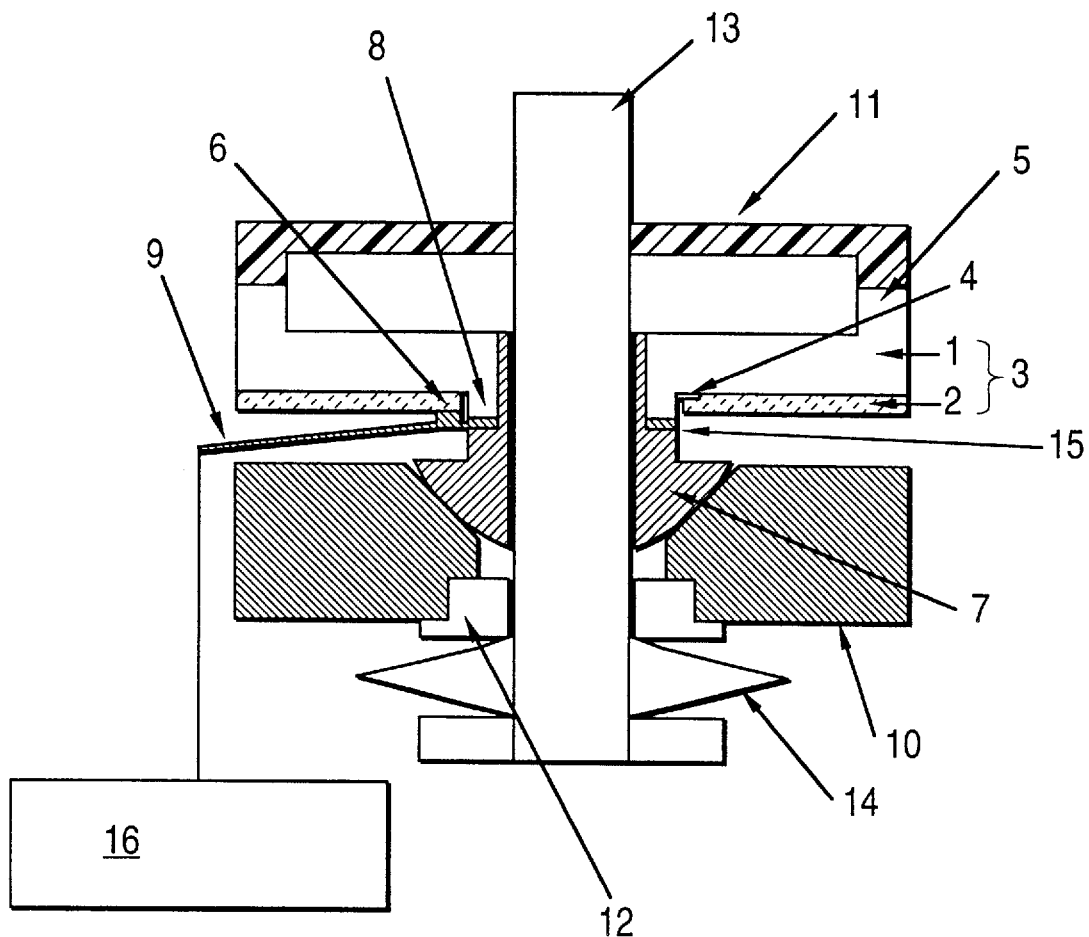
FIG. 1 shows a structure of an ultrasonic motor in a first embodiment of the invention.
Figure 2:
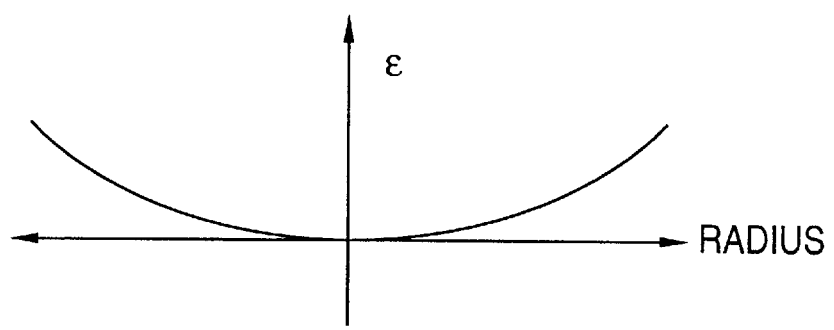
FIG. 2 shows a primary vibrating displacement in the radial direction.
Figure 3A:
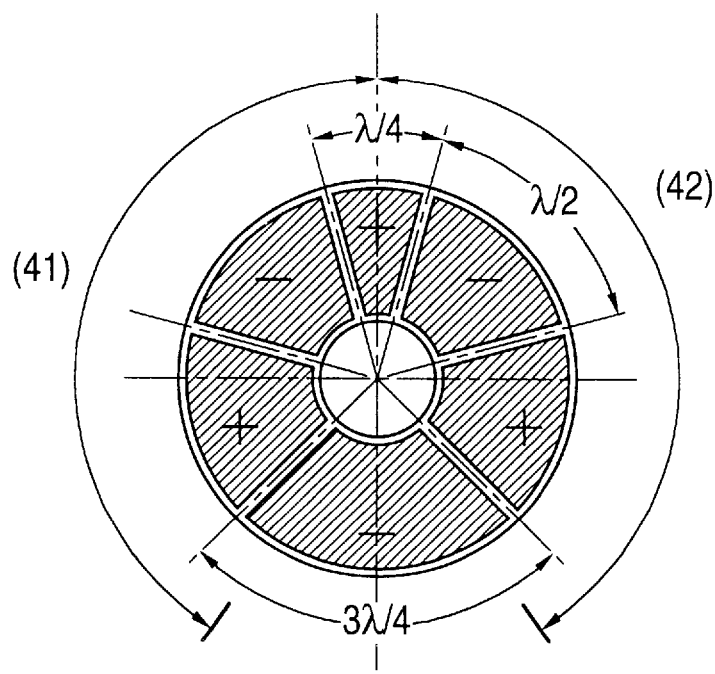
FIG. 3(a) and FIG. 3(b) show poles and electrodes of a piezoelectric element of the ultrasonic motor in the first embodiment.
Figure 3B:
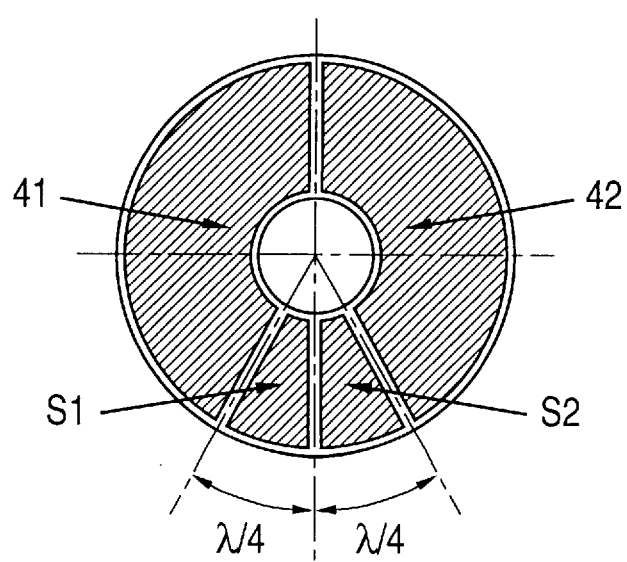
Figure 4:
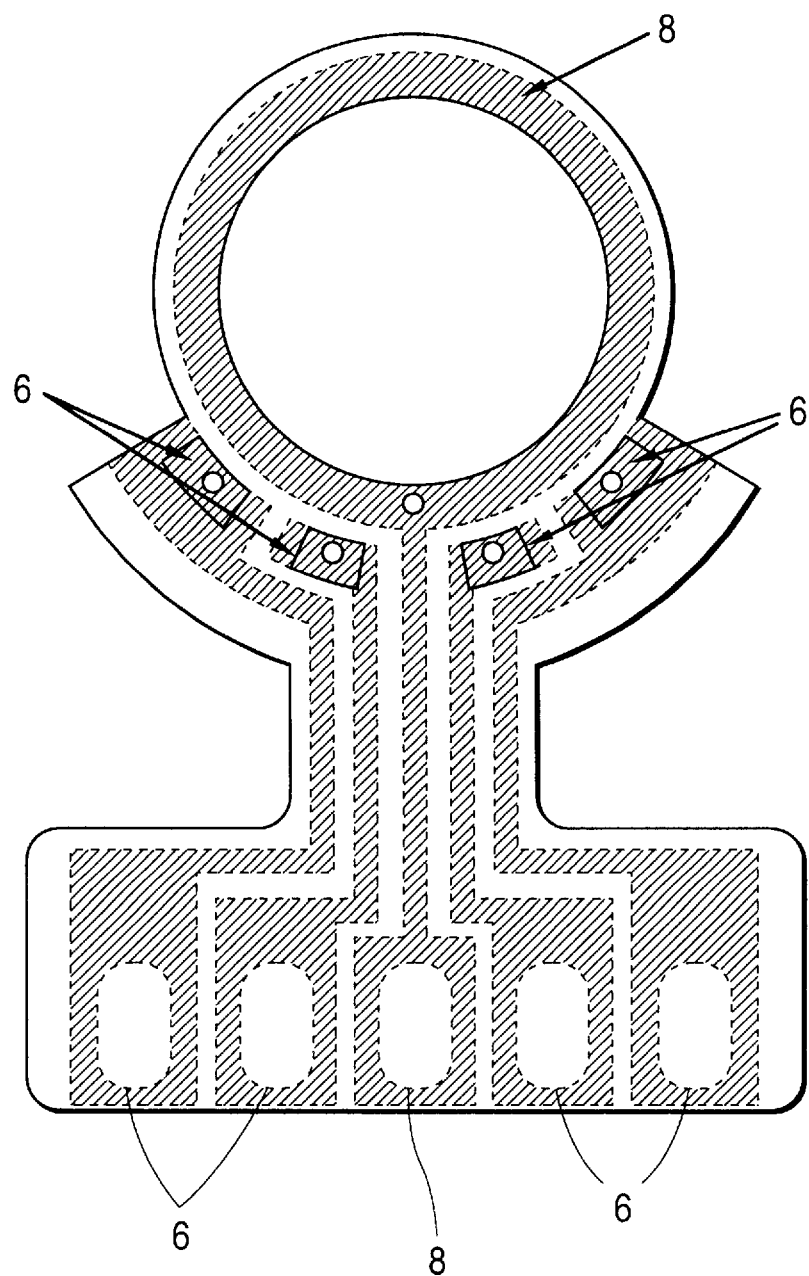
FIG. 4 shows an example of lead wire means formed by flexible printing wiring.
Figure 5:
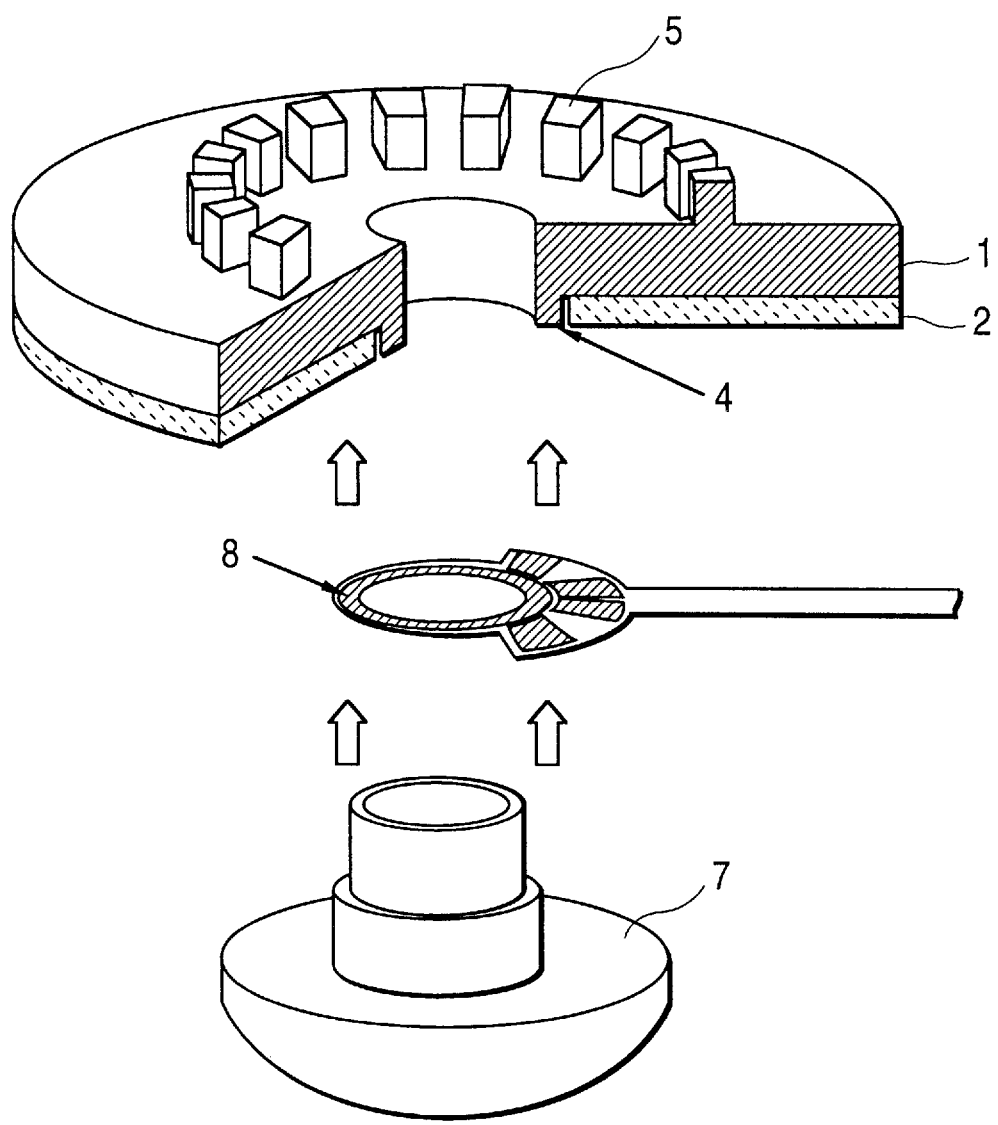
FIG. 5 shows an assembly of the ultrasonic motor in the first embodiment.
Figure 6:
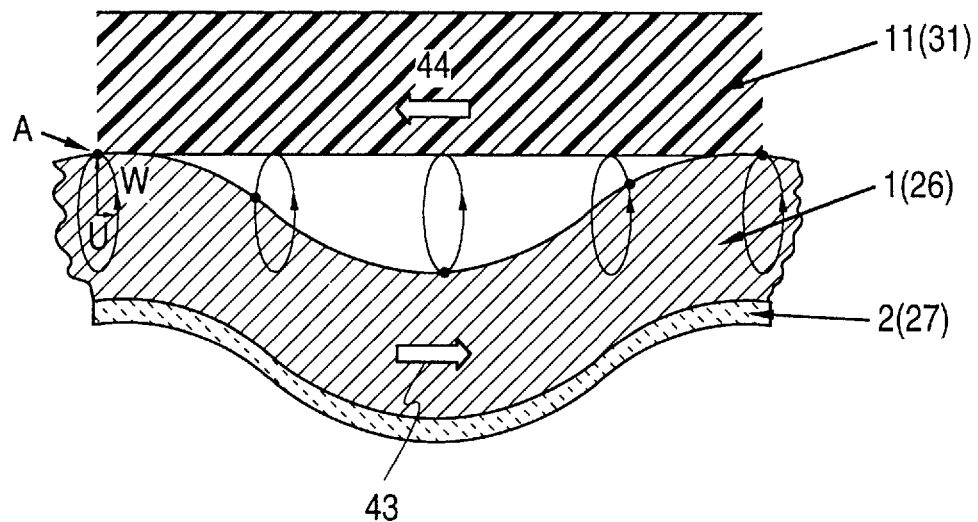
FIG. 6 explains the operation of the ultrasonic motor.
Figure 20:
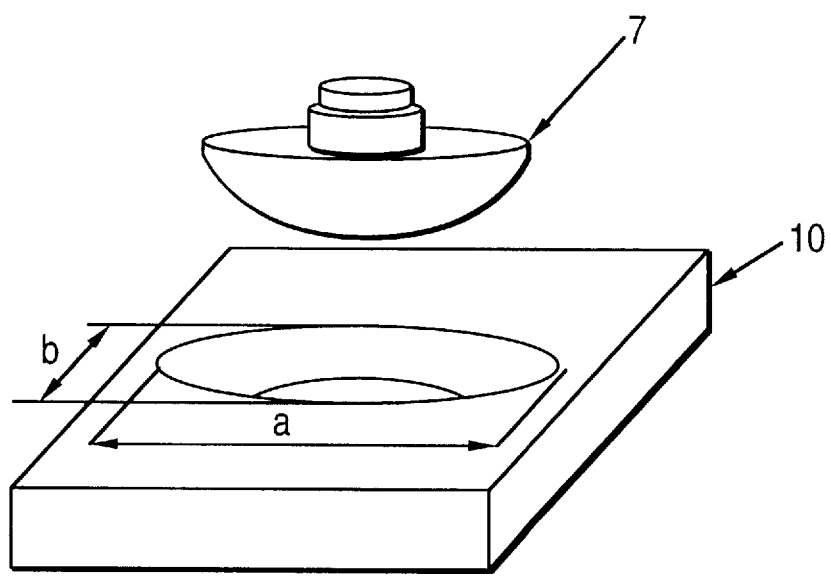
FIG. 20 shows an example of the supporting component and the supporting base.
Figure 21:
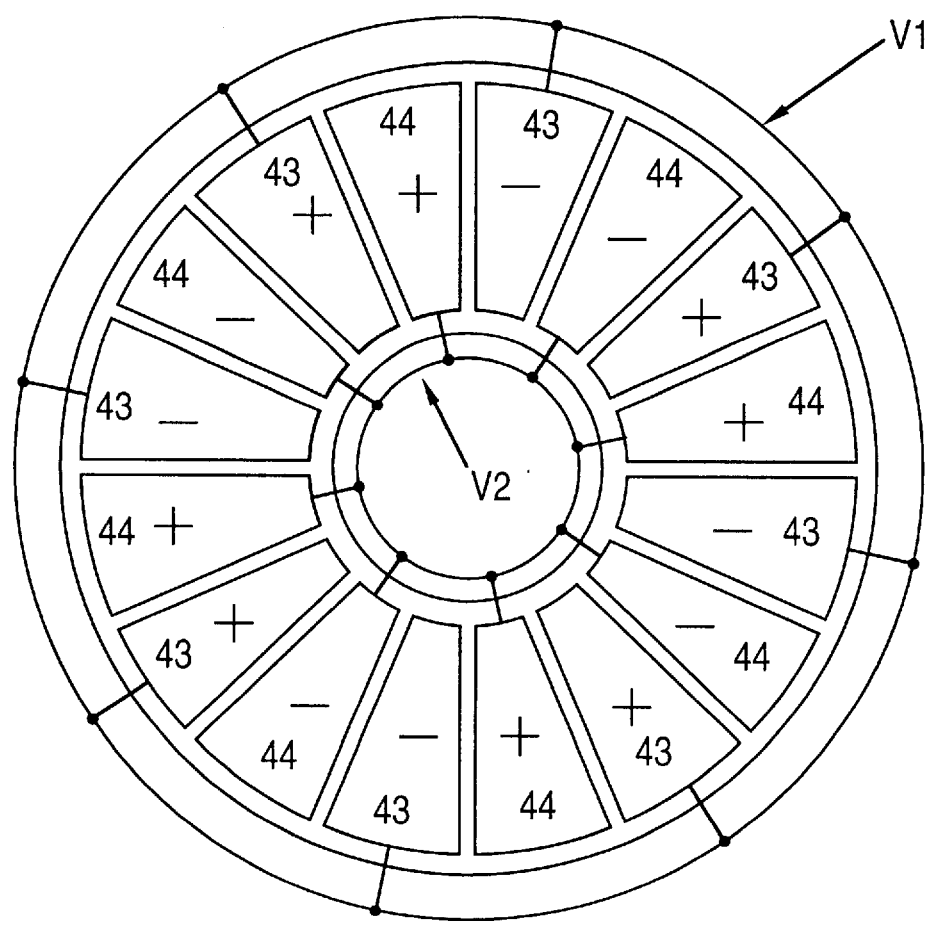
FIG. 21 shows another example of poles and electrodes of the piezoelectric element.
Figure 22:
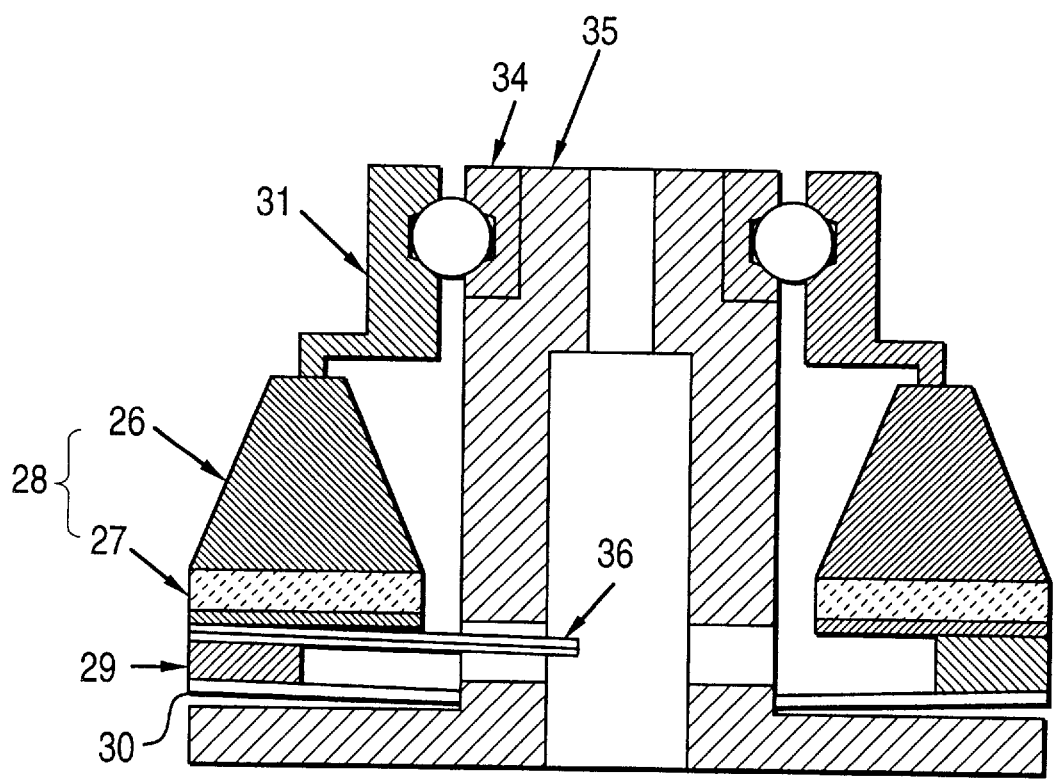
FIG. 22 shows a structure of a conventional ultrasonic motor.
Figure 23:
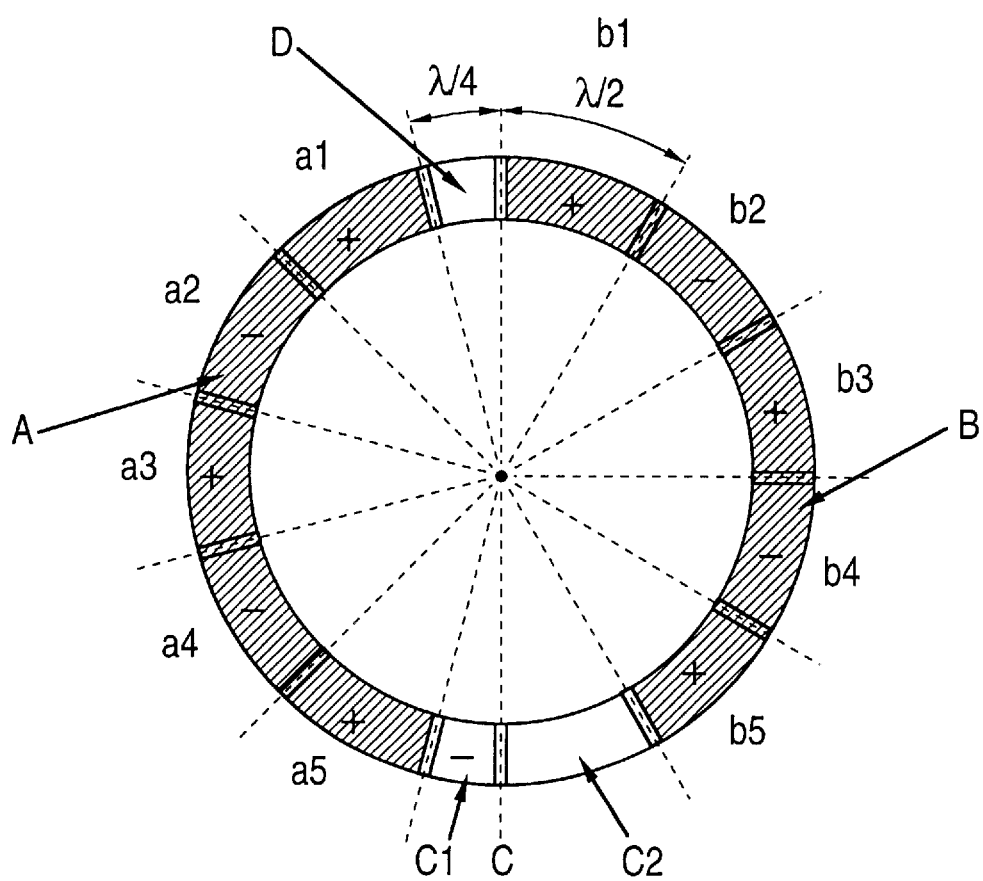
FIG. 23 shows prior art poles and electrodes of a piezoelectric element.
Figure 24:
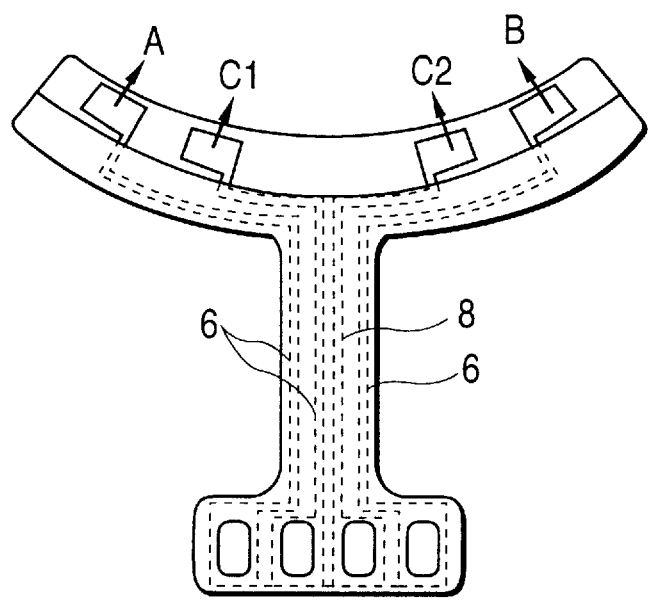
FIG. 24 shows an example of lead wire means formed by flexible printing wiring.

FIG. 1 shows a first embodiment of the invention. A vibrating body 3 comprises an elastic element I made of metal such as iron, stainless steel, copper, brass or aluminum, and a piezoelectric element 2 such as piezoelectric ceramic or piezoelectric polymer. The elastic element 1 has a protrusion 5 for giving a driving force to the moving element 11 on its upper surface, and a cylindrical boss 4 on its lower surface. The upper surface of the piezoelectric element 2 is fixed to the lower surface of the elastic element 1. A supporting component 7 possessing an intermediate step portion 15 and a rounded lower end is fixed to the elastic element 1 at its upper end, and is supported on the tapered dent of a supporting base 10 at its rounded lower end. Lead wire means 9 electrically couples the piezoelectric element 2 and a driving circuit 16. The piezoelectric element 2 possesses an upper surface entirely covered with a common electrode, and a lower surface covered with plural individual electrodes. In order that the common electrode may be electrically coupled with the metal elastic element 1, the upper surface of the piezoelectric element 2 is fixed to the lower surface of the elastic element 1. FIG. 3 (a) shows poles in the lower surface of the piezoelectric element 2, and the signs 4 and – denote the polarity of the poles. FIG. 3 (b) shows plural individual electrodes covering the lower surface of the piezoelectric element 2. In FIG. 3 (a), reference numeral (41) denotes the covering region of an individual electrode 41, and (42) denotes the covering region of an individual electrode 42. The plural poles in (41) are excited by an alternating-current voltage V1 applied between the individual electrode 41 and common electrode (not shown in FIG. 3). The plural poles in (42) are excited by an alternating-current voltage V2 having a 90-degree time phase difference from V1. The voltage V2 is applied between the individual electrode 42 and common electrode. Reference numerals S1, S2 are sensor electrodes for detecting the vibrations of the vibrating body 3 by using the piezoelectric effect. FIG. 4 is an example of the lead wire means 9 formed by printed wiring. The lead wire means 9 comprises a first lead wire 8 for coupling the common electrode and the driving circuit, and plural second lead wires 6 for coupling the individual electrodes and the driving circuit. The first lead wire 8 has a ring-shaped portion at one end. As shown in FIG. 1, one end of each second lead wire 6 is connected to an individual electrode at the lower surface of the piezoelectric element 2. As shown in FIG. 5, the ring-shaped portion of the first lead wire 8 is pressed to the elastic element 1 while being held between the boss 4 and step portion 15 of the supporting component 7. In this manner the first lead wire 8 may be electrically coupled with the common electrode of the upper surface of the piezoelectric element 2 through contact with the metal elastic element 1. The other ends of the lead wires 6, 8 are connected to the driving circuit 16. A shaft 13 fixed to the moving body 11 is rotatably supported by a bearing 12. A spring 14 pushes downward the shaft 13 downward so as to press the moving body 11 against the protrusion 5 of the elastic element 1. The moving body 11 is composed of a resin, such as polytetrafluoroethylene, polyacetal, PPS (polyphenylene sulfide), PES (polyether sulfone), PEEK (polyether ethyl ketone), or a compound material of such resin with carbon fiber, graphite fiber or glass fiber, or resin coated metal or compound material coated metal. As in the prior art, alternating-current voltages V1, V2 at frequency close to resonance frequency of the vibrating body 3 with a 90-degree time phase difference are applied to the electrodes 41, 42 in FIG. 3. As shown in FIGS. 2 and 6, in the vibrating body 3, traveling waves of elastic vibrations of a primary or higher degree in the radial direction and three waves or more in the peripheral direction are generated in the vibrating body 3. The moving body 11, which is pressed to the vibrating body 3, move due to the traveling waves. As mentioned above, since the first lead wire 8 is coupled to the common electrode of the piezoelectric element 2 through contact with the elastic element 1, conductive resin for connecting the common electrode and first lead wire is not used. Therefore, there is no damage such as defective conduction due to peeling of conductive resin or short circuit due to migration. Moreover, since the first lead wire 8 and common electrode of the piezoelectric element 2 are coupled without soldering as mentioned above, the adhesion between the elastic element 1 and piezoelectric element 2 is not damaged by high the temperature of soldering. The boss 4 is effective for positioning the piezoelectric element 2 on the elastic element 1. Furthermore, the boss 4 prevents inflow of the adhesive into the central hole of the elastic element 1, which causes deformation of the elastic element 1 when the supporting component 7 is press-fitted into the central hole of the elastic element 1. This is effective for obtaining a uniform contact between the elastic element 1 and moving body 11 necessary for an ultrasonic motor of large output. The boss 4 may be formed as plural protrusions disposed circularly, instead of the cylindrical form. Since the rounded lower end of the supporting component 7 is supported in the tapered dent of the supporting base 10 if a side pressure is applied to the shaft, the supporting component 7 is inclined relative to the supporting base 10 so that the contact between the vibrating body 3 and moving body 11 may be kept stable. As a result, regardless of the side pressure, a stable motor rotation is always obtained. The supporting component 7 is composed of metal, resin, or metal plated resin. The tapered dent of the supporting base 10 is conical in most cases. However, as long as the rounded end of the supporting component 7 is supported at least at three points, it may be composed in another form, such as a pyramidal form shown in FIG. 9. Or, as shown in FIG. 20, it is also possible to combine the elliptical rounded lower end of the supporting component 7 and the conical dent of the supporting base 10. In this case, rotation of the supporting component 7 by reaction torque is prevented by the ellipse. FIG. 21 shows other example of poles and electrodes of the piezoelectric element 2. The piezoelectric element 2 is polarized into eight poles, and the individual electrodes 43 and 44 are alternately disposed on the poles. The alternating-current voltage V1 is applied to the individual electrode 43, and the alternating-current voltage V2 with a 90-degree time phase difference from V1 is applied to the individual electrode 44. Since the entire surface of the piezoelectric element 2 in FIG. 21 is effectively utilized, the driving efficiency is enhanced. By the electrodes of two phases being disposed alternately, the load distribution is averaged and a stable operation is obtained even if the shaft is inclined.

(2ND EMBODIMENT)

Figure 7:
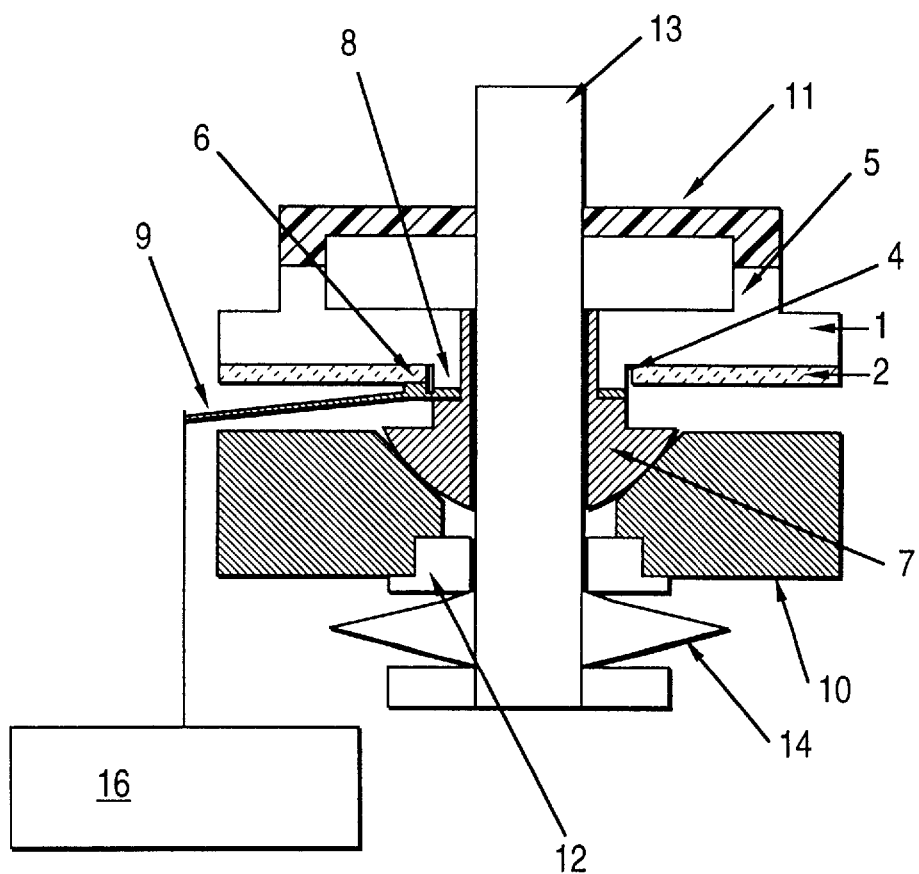
FIG. 7 shows a structure of an ultrasonic motor in a second embodiment of the invention.
Figure 8A:
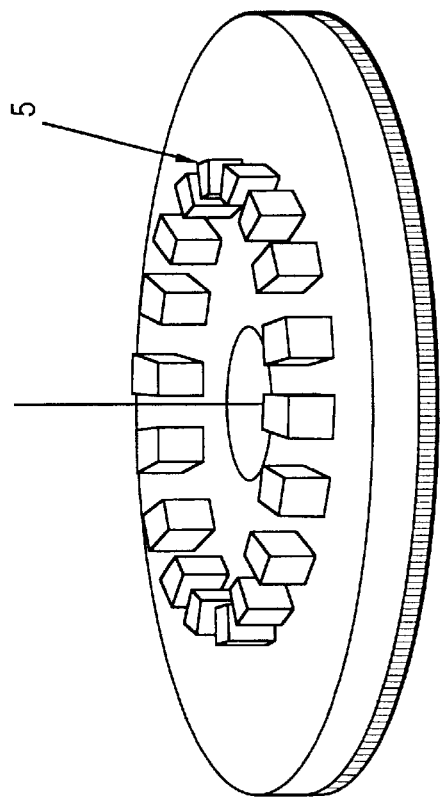
FIG. 8(a) and FIG. 8(b) explain the torque of the ultrasonic motor.
Figure 8B:
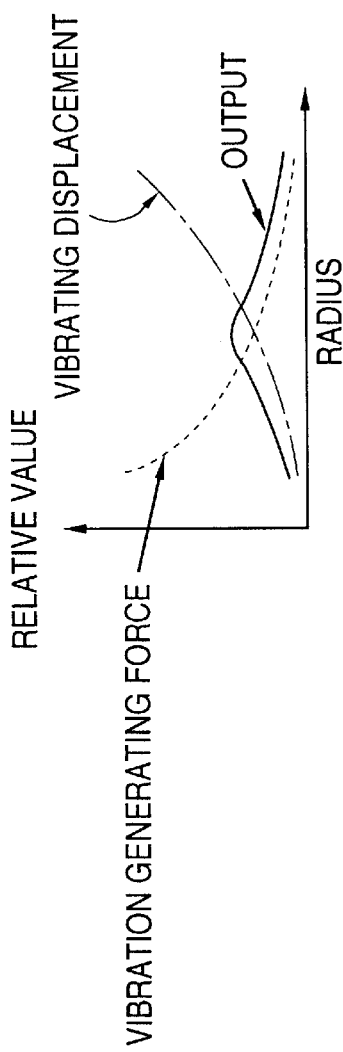

FIG. 7 shows a second embodiment of the invention. The protrusion 5 of the embodiment is positioned so as to obtain a maximum motor output for a specific pressurizing force applied between the vibrating body and moving body. This positioning allows a desired motor output power and torque to be obtained. The motor output is the product of an output torque and rotating speed. The output torque is determined by the product of the pressurizing force applied between the vibrating body and the moving body, the coefficient of friction between the vibrating body and moving body, and the effective driving radius. The rotating speed is the time differential of the vibrating displacement of the vibrating body. Therefore, the motor output is the product of the vibration generating force necessary for the vibrating body to maintain the vibration while resisting the pressurizing force, and the vibrating displacement. The protrusion 5 is positioned at the position of maximum distribution of the vibration generating force and the vibrating displacement necessary for maintaining the primary vibration in the radial direction, for a given input power and pressuring force as shown in FIG. 8.

(3RD EMBODIMENT)

Figure 9:
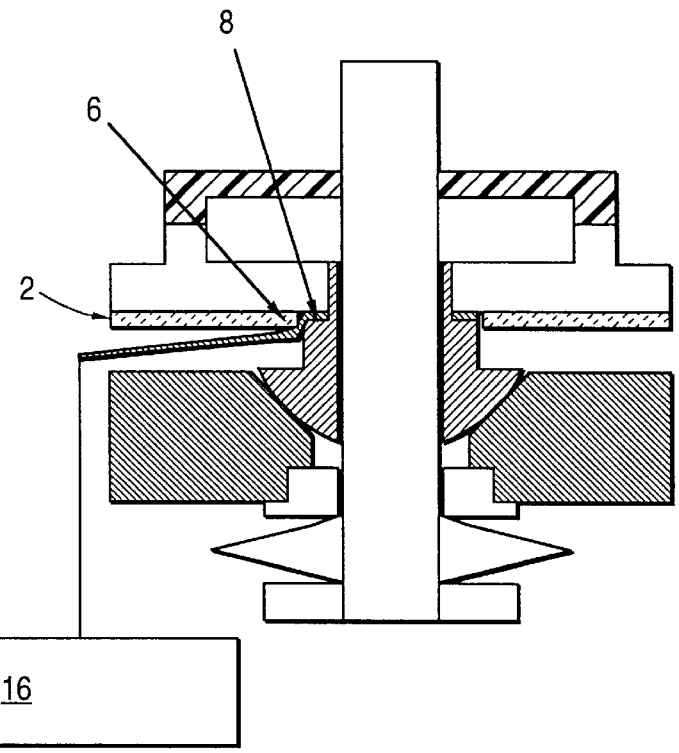
FIG. 9 shows a structure of an ultrasonic motor in a third embodiment of the invention.

FIG. 9 shows a third embodiment of the invention. As compared with the second embodiment, the elastic element 1 is not furnished with boss 4 in this embodiment. The first lead wire 8 is pushed into the inside hole of the piezoelectric element 2. The elastic element 1 is simple in shape and is hence low in the vibrating resistance, so that an ultrasonic motor of low power consumption is realized.

(4TH EMBODIMENT)

Figure 10:
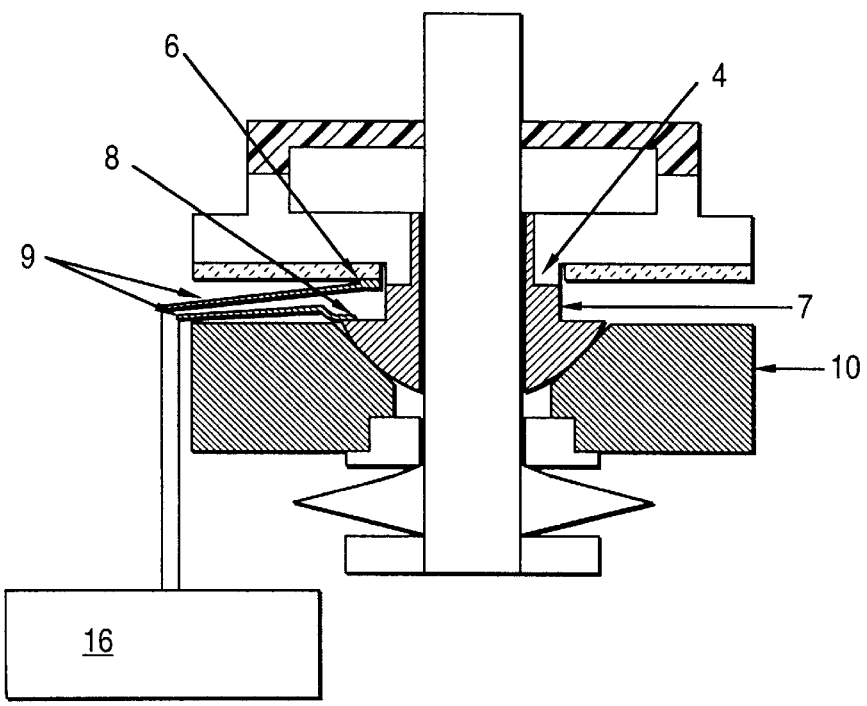
FIG. 10 shows a structure of an ultrasonic motor in a fourth embodiment of the invention.

FIG. 10 shows a fourth embodiment of the invention. This embodiment differs from the second embodiment in connection of the first lead wire 8. One end of the first lead wire 8 is connected to the supporting component 7 by soldering or another method so that the first lead wire 8 may be coupled to the common electrode on the upper surface of the piezoelectric element 2 through the supporting component 7 of conductive material and the metal elastic element 1. The end of the first lead wire 8 is not pinched between the supporting component 7 and elastic element 1 as in the second embodiment, and inclination between the supporting component 7 and elastic element 1 due to uneven thickness of the first lead wire 8 is eliminated. The end of the first lead wire 8 is not soldered to the elastic element 1, and the adhesion of the elastic element 1 and piezoelectric element 2 is not damaged by the high temperature of soldering. Moreover, when the supporting base 10 is conductive, one end of the first lead wire 8 may also be connected to the supporting base 10 so as to be coupled to the common electrode on the upper surface of the piezoelectric element 2 through the supporting base 10, supporting component 7, and elastic element 1.

(5TH EMBODIMENT)

Figure 11:
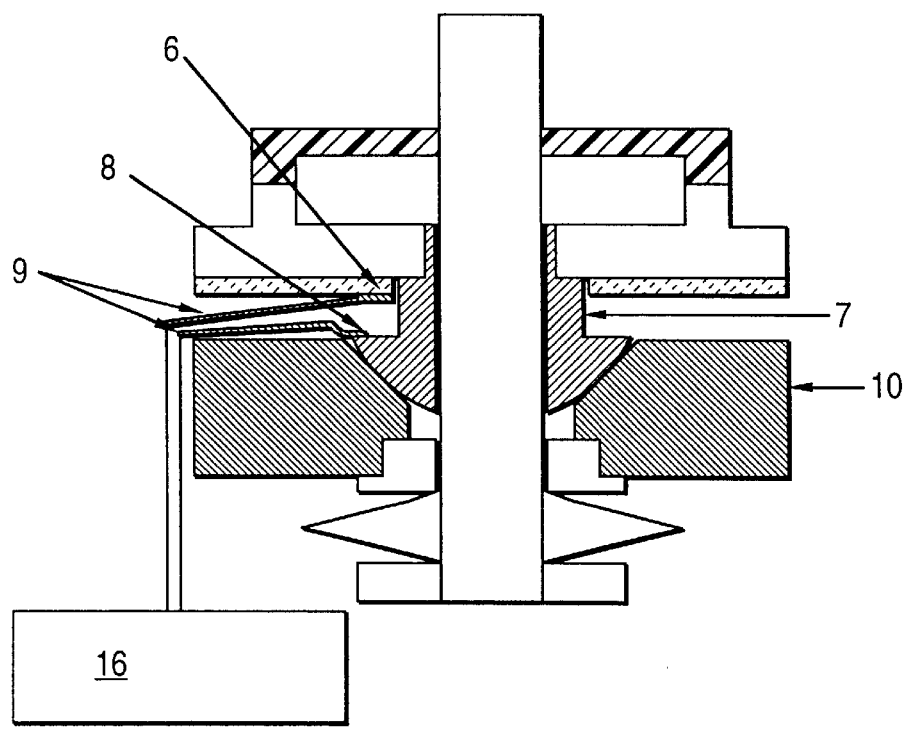
FIG. 11 shows a structure of an ultrasonic motor in a fifth embodiment of the invention.

FIG. 11 shows a fifth embodiment of the invention. As compared with the fourth embodiment, the elastic element 1 does not have boss 4 in this embodiment. The elastic element 1 is simple in form, and is hence low in vibrating resistance, so that an ultrasonic motor of low power consumption is realized.

(6TH EMBODIMENT)

Figure 12:
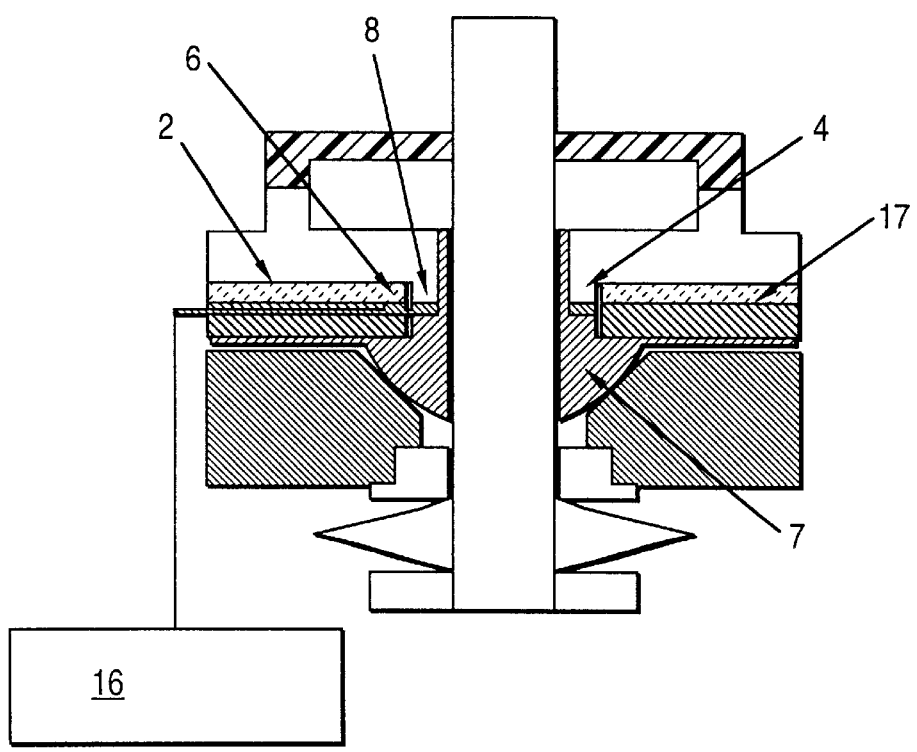
FIG. 12 shows a structure of an ultrasonic motor in a sixth embodiment of the invention.

FIG. 12 shows a sixth embodiment of the invention. In this embodiment, as compared with the second embodiment, a cushion component 17 is inserted between the lower surface of the piezoelectric element 2 and the supporting component 7. The cushion component 17 is composed of felt or some other insulating fiber. The supporting component 7 has an area near the same size as the piezoelectric element 2 to support the cushion component 17. The cushion component 17 absorbs vibrations due to imbalance of the two-phase driving voltage applied to the piezoelectric element 2 or due to any mechanical imprecision between the contact surface of the vibrating body and the moving body. The cushion thus allows the realization of a stabler motor drive.

(7TH EMBODIMENT)

Figure 13:
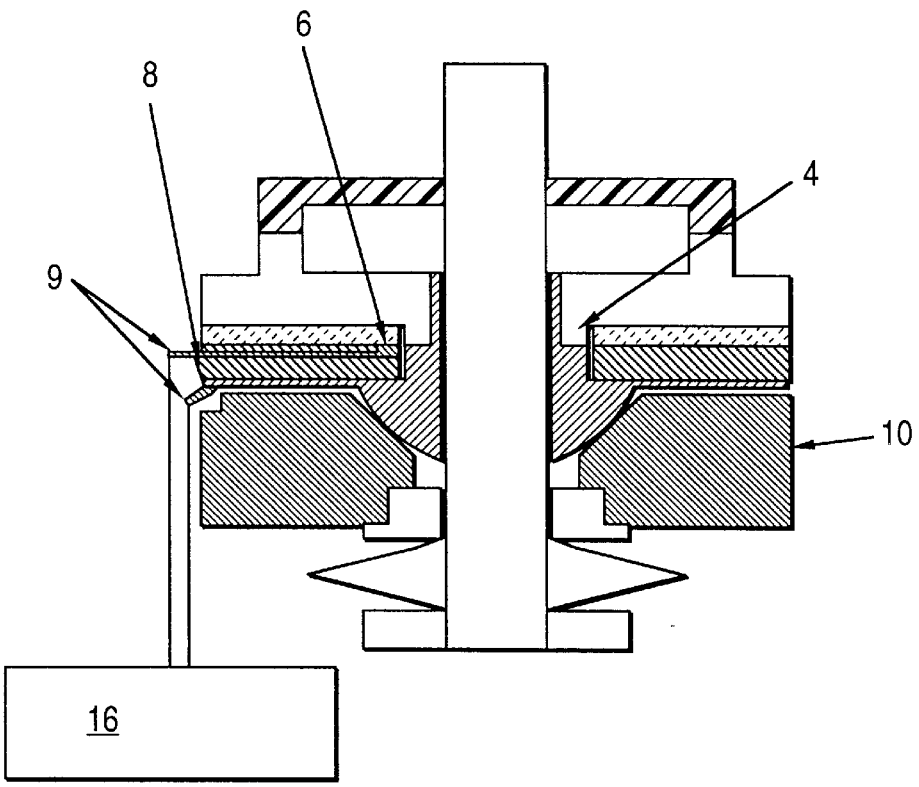
FIG. 13 shows a structure of an ultrasonic motor in a seventh embodiment of the invention.

FIG. 13 shows a seventh embodiment of the invention. In this embodiment, connection of the first lead wire 8 is different from the sixth embodiment. One end of the first lead wire 8 is connected to the supporting component 7 by soldering or another method so that the first lead wire 8 may be coupled to the common electrode on the upper surface of the piezoelectric element 2 through the supporting component 7 of conductive material and the metal elastic element 1. The one end of the first lead wire 8 is not pinched between the supporting component 7 and elastic element 1 as in the sixth embodiment, and inclination between the supporting component 7 and elastic element 1 due to uneven thickness of the first lead wire 8 is eliminated. The end of the first lead wire 8 is not soldered to the elastic element 1, and the adhesion of the elastic element 1 and piezoelectric element 2 is not damaged by the high temperature of soldering. Moreover, when the supporting base 10 is conductive, one end of the first lead wire 8 may also be connected to the supporting base 10 so as to be coupled to the common electrode on the upper surface of the piezoelectric element 2 through the supporting base 10, supporting component 7, and elastic element 1.

(8TH EMBODIMENT)

Figure 14:
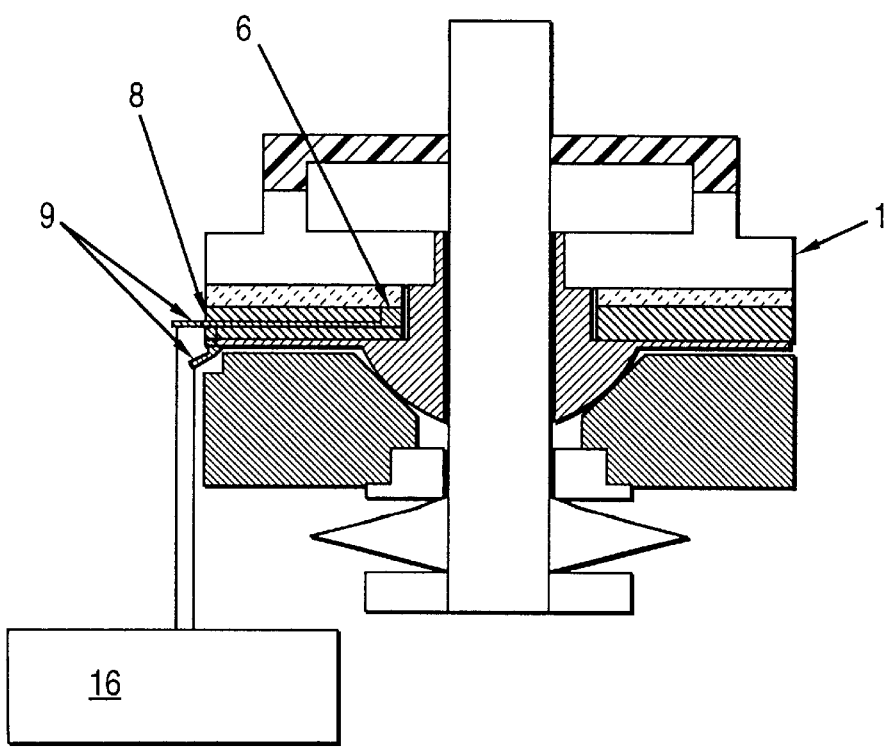
FIG. 14 shows a structure of an ultrasonic motor in an eighth embodiment of the invention.

FIG. 14 shows an eighth embodiment of the invention. As compared with the seventh embodiment, the elastic element 1 does not have boss 4 in this embodiment. The elastic element 1 is simple in form, and is hence low in vibrating resistance, so that an ultrasonic motor of low power consumption is realized.

(9TH EMBODIMENT)

Figure 15:
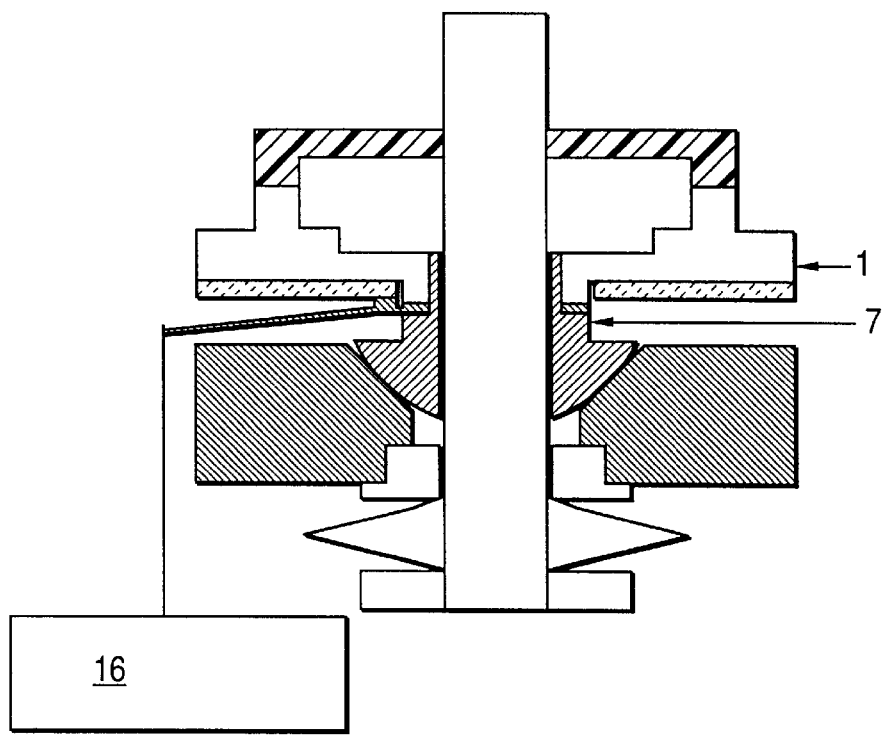
FIG. 15 shows a structure of an ultrasonic motor in a ninth embodiment of the invention.

FIG. 15 shows a ninth embodiment of the invention. In this embodiment, as compared with the second embodiment, the thickness of the elastic element 1 is decreased in the inner peripheral edge. Hence, suppression of vibration at the junction of the elastic element 1 and supporting component 7 decreases, so that an ultrasonic motor of low power consumption is realized.

(10TH EMBODIMENT)

Figure 16:
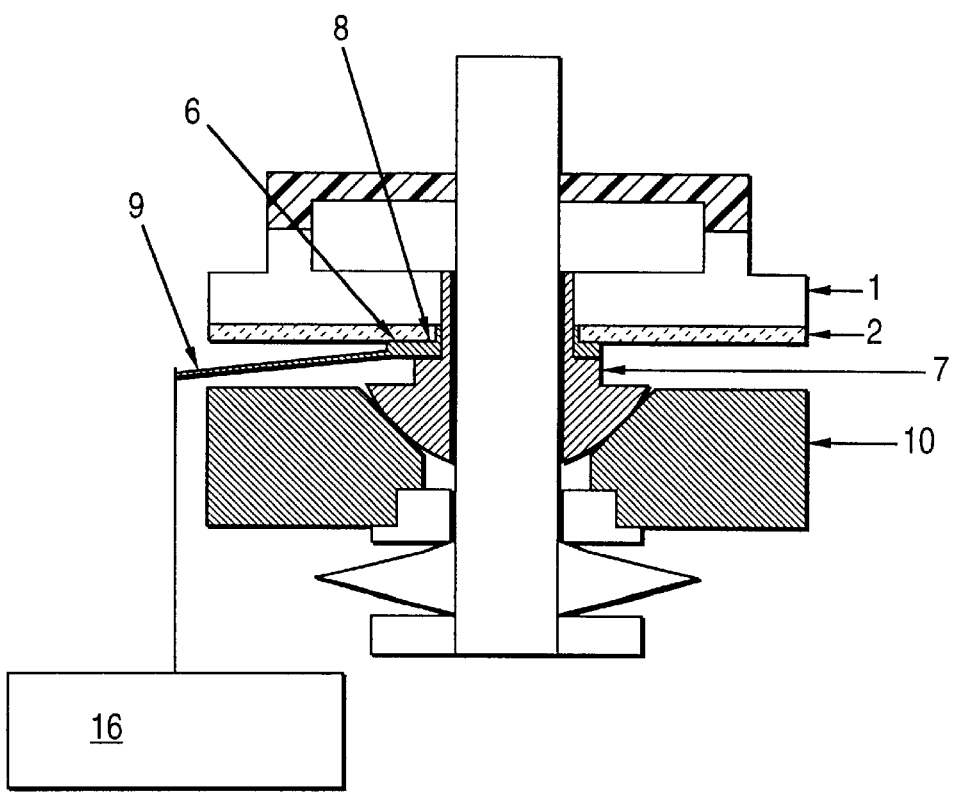
FIG. 16 shows a structure of an ultrasonic motor in a tenth embodiment of the invention.

FIG. 16 shows a tenth embodiment of the invention. As compared with the third embodiment, the piezoelectric element 2 of the embodiment has a smaller inner diameter.

Figure 17A:
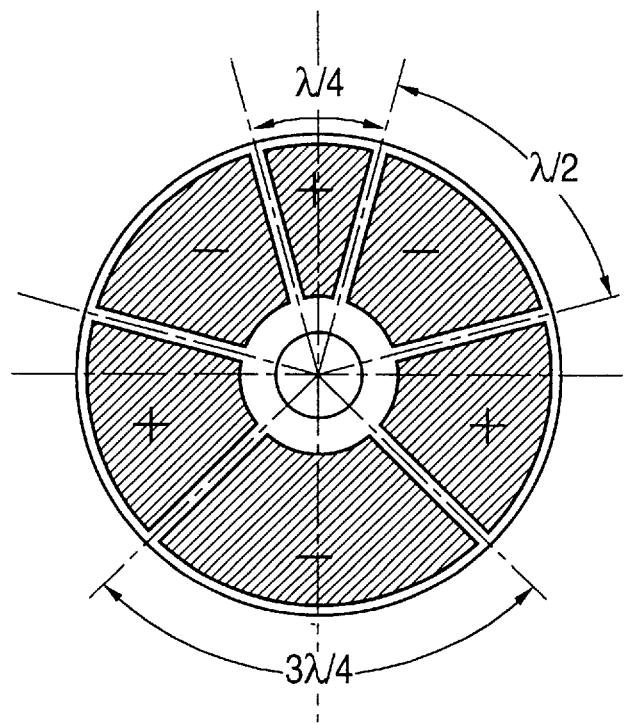
FIG. 17(a) and FIG. 17(b) show poles and electrodes of a piezoelectric element of the ultrasonic motor in the tenth embodiment.
Figure 17B:
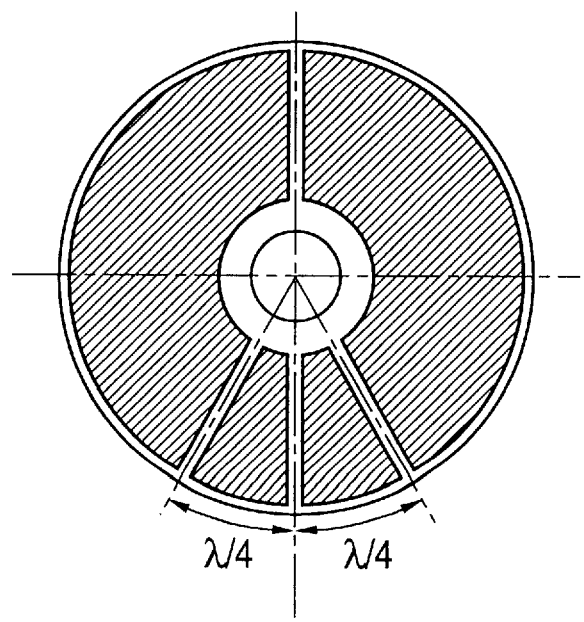

Moreover, the supporting component 7 is conductive. One end of the first lead wire 8 is held between the piezoelectric element and supporting component 7, and is coupled to the common electrode on the upper surface of the piezoelectric element 2 through the supporting component 7 and elastic element 1. FIG. 17 shows poles and electrodes of the piezoelectric element.

(11TH EMBODIMENT)

Figure 18:
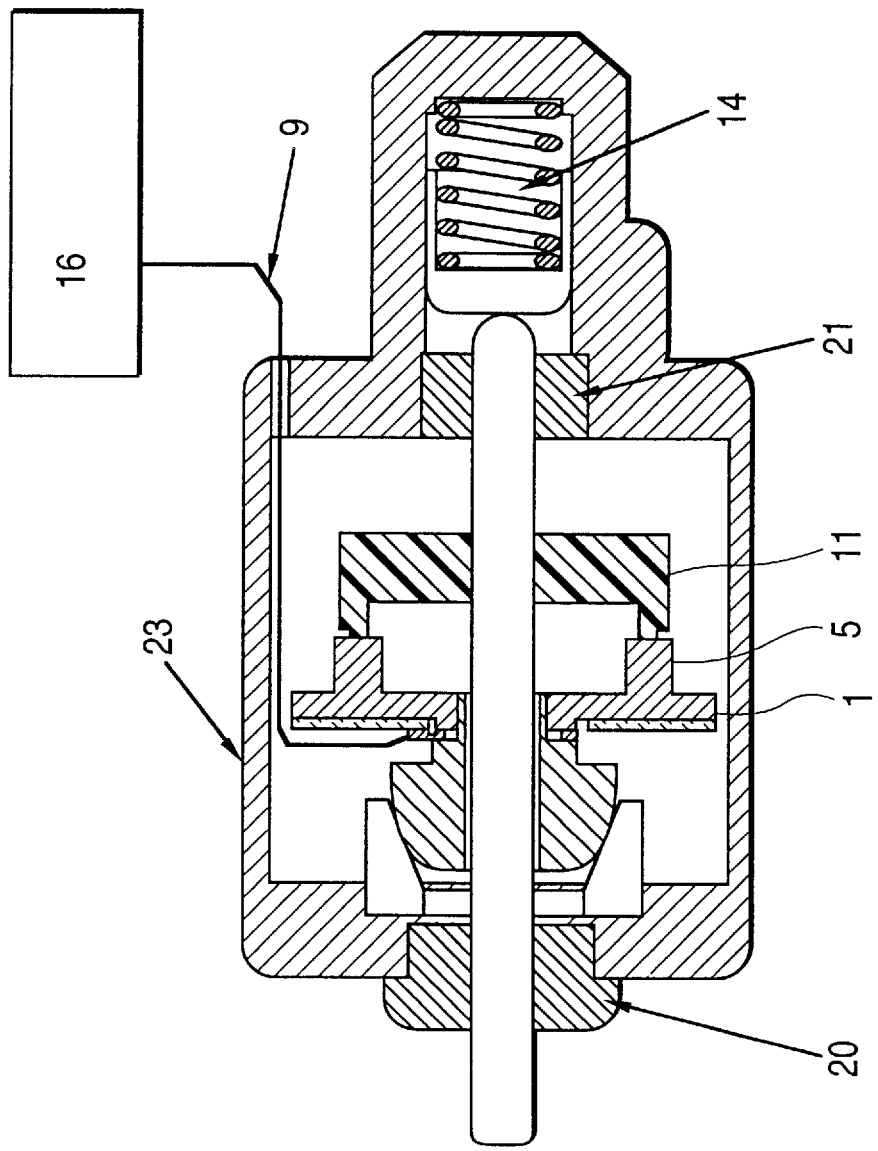
FIG. 18 shows a structure of an ultrasonic motor in an eleventh embodiment of the invention.
Figure 19A:
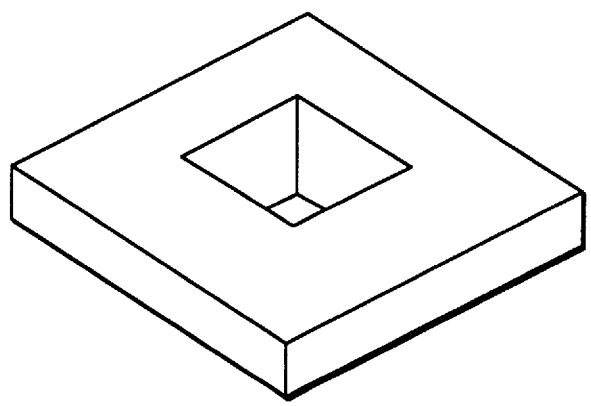
FIG. 19(a) and FIG. 19(b) show two examples of a dent in a supporting base.
Figure 19B:
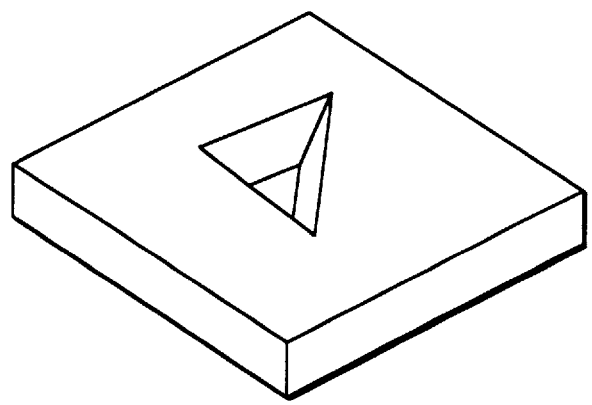

FIG. 18 shows an eleventh embodiment of the invention. The entire ultrasonic motor of the second embodiment is installed in a 23. Bearings 20, 21 support a shaft 13. A spring 14 presses the moving body 11 to the protrusion 5 on the elastic element 1 by pushing the rounded front end of the shaft 13.

What is claimed is:

1. An ultrasonic motor comprising:
    a vibrating body comprising:
        a metal elastic element having an upper surface and a lower surface, with plural protrusions formed on the upper surface of the elastic element, and
        a piezoelectric element having an upper surface and a lower surface, with plural individual electrodes formed on the lower surface of the piezoelectric element and a common electrode on the upper surface of the piezoelectric element, the upper surface of the piezoelectric element being fixed to the lower surface of the elastic element so that the common electrode may be electrically coupled to the elastic element,
            wherein the vibrating body vibrates by inverse piezoelectric effect of the piezoelectric element;
    a moving body,
        wherein the moving body is driven by vibrations of the vibrating body, and moves relative to the vibrating body;
    pressing means for pressing the moving body against the plural protrusions on the vibrating body;
    a supporting component having an upper end, a rounded lower end, and at least one flat portion formed between the upper end and the rounded lower end,
        wherein the upper end of the supporting component is fixed to the vibrating body, and the rounded lower end projects downward from the vibrating body;
    a supporting base having a tapered dent,
        wherein the supporting base supports the rounded lower end of the supporting component by the dent;
    a driving circuit for driving the ultrasonic motor;
    a first lead wire,
        wherein one end of the first lead wire is held between the lower surface of the elastic element and the flat portion of the supporting component and is pressed against the lower surface of the elastic element so as to be coupled electrically to the common electrode of the piezoelectric element through contact with the elastic element, and the other end of the first lead wire is coupled to the driving circuit; and
    plural second lead wires,
        wherein one end of each second lead wire is respectively coupled to one of the individual electrodes of the piezoelectric element, and the other end of each second lead wire is respectively coupled to the driving circuit.

2. An ultrasonic motor of claim 1, further comprising:
    a boss projecting from a central part of the lower surface of the elastic element, and
    the one end of the first lead wire is held between the boss of the elastic element and the flat portion of the supporting component and is pressed against the boss of the elastic element so as to be coupled electrically to the common electrode of the piezoelectric element through contact with the elastic element.

3. An ultrasonic motor of claim 1,
wherein the supporting component is made of resin.

4. An ultrasonic motor of claim 1,
wherein the supporting component is made of metal plated resin.

5. An ultrasonic motor of claim 1,
wherein the supporting component is made of metal.

6. An ultrasonic motor of claim 2,
wherein the boss is cylindrical.

7. An ultrasonic motor of claim 2,
wherein the boss is composed of plural protrusions disposed in a circular form.

8. An ultrasonic motor of claim 1, further comprising:
an insulating cushion sheet for covering the lower surface of the piezoelectric element.

9. An ultrasonic motor of claim 8,
wherein the insulating cushion sheet is made of felt.

10. An ultrasonic motor comprising:
    a vibrating body comprising:
        a metal elastic element having an upper surface and a lower surface, with plural protrusions formed on the upper surface of the elastic element, and
        a piezoelectric element having an upper surface and a lower surface, with plural individual electrodes formed on the lower surface of the piezoelectric element and a common electrode on the upper surface of the piezoelectric element, the upper surface of said piezoelectric element being fixed to the lower surface of the elastic element so that the common electrode may be electrically coupled to the elastic element,
            wherein the vibrating body vibrates by inverse piezoelectric effect of the piezoelectric element;
    a moving body,
        wherein the moving body is driven by vibrations of the vibrating body, and moves relative to the vibrating body;
    a supporting component having an upper end and a rounded lower end,
        wherein the supporting component is conductive, and the upper end of the supporting component is fixed to the vibrating body, and the rounded lower end projects downward from the vibrating body;
    a supporting base having a tapered dent,
        wherein the supporting base supports the rounded lower end of the supporting component by the dent;
    a driving circuit for driving the ultrasonic motor;
    a first lead wire;
        wherein one end of the first lead wire is connected to the supporting component so as to be coupled electrically to the common electrode of the piezoelectric element through the supporting component and the elastic element, and the other end of the first lead wire is coupled to the driving circuit; and
    plural second lead wires,
        wherein one end of each second lead wire is respectively coupled to one of the individual electrodes of the piezoelectric element, and the other end of each second lead wire is respectively coupled to the driving circuit.

11. An ultrasonic motor of claim 10, further comprising:
an insulating cushion sheet for covering the lower surface of the piezoelectric element.

12. An ultrasonic motor of claim 11,
wherein the insulating cushion sheet is made of felt.

13. An ultrasonic motor of claim 1,
wherein the plural protrusions on the upper surface of the elastic element are positioned at the position where the product of distribution of a time differential of a vibrating displacement of the vibrating body and distribution of vibration generating force of the vibrating body may be maximum.

14. An ultrasonic motor of claim 10,
wherein the plural protrusions on the upper surface of the elastic element are positioned at the position where the product of distribution of a time differential of a vibrating displacement of the vibrating body and distribution of vibration generating force of the vibrating body may be maximum.

* * * * *